April 30, 1940.  R. D. SMITH  2,198,745

METHOD OF DESULPHURIZING LEHR GASES

Filed April 26, 1937

INVENTOR.
ROWLAND D. SMITH
BY Dorsey, Cole + Garner
ATTORNEYS.

Patented Apr. 30, 1940

2,198,745

UNITED STATES PATENT OFFICE 2,198,745

METHOD OF DESULPHURIZING LEHR GASES

Rowland D. Smith, Corning, N. Y., assignor to Corning Glass Works, Corning, N. Y., a corporation of New York Application April 26, 1937, Serial No. 139,054

4 Claims. (Cl. 49—77)

This invention relates to the annealing of glass and to lehrs therefor and particularly to that type of lehr in which the combustion gases of the heat source are circulated through a conveyor or continuous lehr belt on which the ware to be annealed is carried.

The primary object of the invention is to prevent the formation of haze or bloom on the surface of the glassware.

Another object of the invention is to remove sulphur compounds from the combustion products of the lehr.

In lehrs of the continuous type in which the gases of combustion are circulated around the ware, difficulty has been experienced with the formation of a white haze or bloom on the surface of the ware which must subsequently be washed off at considerable expense. I have found that this coating on the ware consists chiefly of alkali sulphates and is caused by the combination of alkali in the surface of the glass with sulphurous gases, such as $SO_3$ which are present in the combustion products. In lehrs which are fired with artificial gas or fuel oil and in which the ware is carried on a continuous conveyor or belt of metal fabric, the problem is serious and has in some cases more than offset the increased production of these lehrs.

I have found that when an alkaline reacting compound of an alkali metal, such as sodium carbonate, or of an alkaline earth metal whose sulphate is soluble in water, such as magnesium oxide, is introduced into the lehr so as to come freely into contact with the combustion products, the sulphurous components thereof are practically completely absorbed and the formation of an objectionable coating on the ware is prevented. The carbonate or hydroxides of any of the alkali metals may be used in lieu of sodium carbonate but for the purpose of economy I prefer the latter. Likewise, the carbonate or hydroxide of magnesium may be used in lieu of magnesium oxide.

The most convenient manner of introducing the absorbent material into the lehr comprises forming the material into a solution or suspension with water and applying the liquid to the lehr belt or conveyor although it may also be accomplished by coating sand with the liquid, drying the same and passing the coated sand through the lehr on a belt or in pans. Preferably the liquid is applied directly to the lehr belt by passing the belt through a receptacle containing the liquid.

Figure 1:
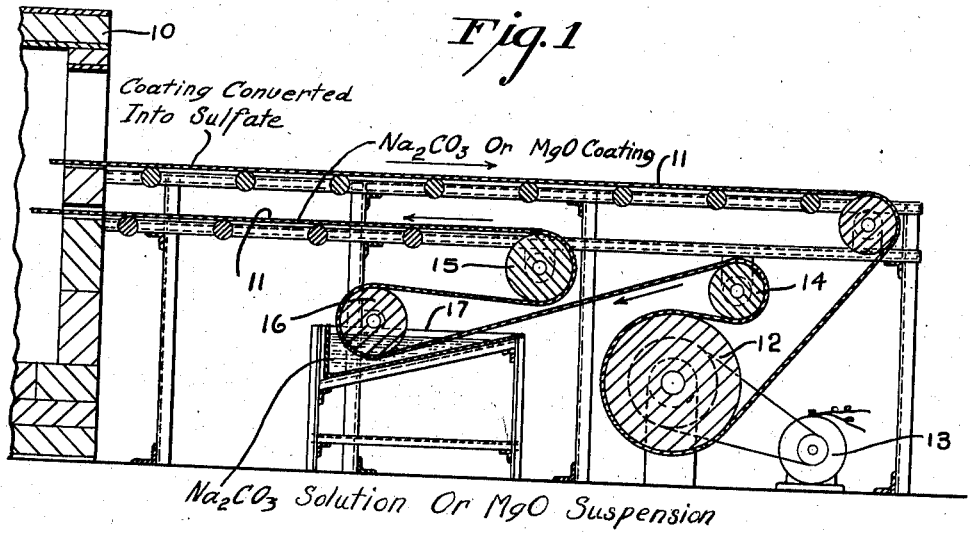
Figure 2:
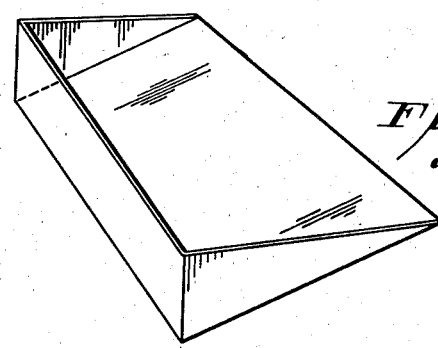

In order that my invention may more readily be understood reference is had to the accompanying drawing in which Fig. 1 is a vertical longitudinal section showing the cold end of a continuous lehr with means for treating the lehr belt in accordance with my invention; and Fig. 2 is a perspective view of a receptacle for treating the lehr belt in accordance with my invention. In the drawing a continuous lehr 10 is provided with an endless belt or conveyor 11 of metal mesh moved by a roll 12 which is driven by a motor 13. The belt is kept taut by a series of tightening or adjusting rolls 14, 15 and 16. Beneath the roll 16 is mounted a pan 17, such as that shown in Fig. 2. The pan 17 is of such breadth and depth that the lower portion of the roll 16 is contained therein and will be immersed in any liquid contained in the pan.

In the practice of the invention, the pan 17 is filled with a water solution or suspension of one of the above recited alkaline salts or compounds, such as sodium carbonate or magnesium oxide. The belt 11 passes continuously around the roll 15 and through the contents of the pan, carrying thence a coating of the material through the lehr. The alkaline material in passing through the heated end of the lehr reacts with the sulphur trioxide in the combustion products and combines therewith to form sulphates. At the temperatures encountered in a lehr, sulphites are decomposed and hence would not be formed. In this type of lehr the conveyor belt passes through the heating chamber twice before returning to the pan 17 or, in other words, the combustion products must pass through two absorbing screens before coming in contact with the ware. Hence substantially all of the sulphurous gases are removed and coating of the ware is prevented. As the conveyor belt on its return to the pan 17 passes again through the dilute solution therein, the sulphate salt is washed off, the conveyor receives a fresh coating of the alkaline material and the cycle is repeated.

I claim:

1. The method of removing sulphurous gases from lehrs, which includes continuously wetting the lehr belt with a solution of sodium carbonate in water, passing the combustion gases upwardly through the belt while in the lehr and washing the accumulated sulphate salt from the belt.

2. The method of removing sulphurous gases from lehrs, which includes continuously wetting the lehr belt with a suspension of magnesium oxide in water, passing the combustion gases up- wardly through the belt while in the lehr and washing the accumulated magnesium sulphate from the belt.

3. The method of preventing a sulphate coating on glassware in a lehr which includes removing sulphurous gases from the lehr by passing the hot combustion gases upwardly through a conveyor coated with an alkaline reacting compound which will absorb sulphur trioxide and form a soluble sulphate on the conveyor while in the lehr before coming in contact with the glassware and washing accumulated sulphate from the conveyor.

4. The method of removing sulphurous gases from lehrs which includes passing the lehr belt through a solution of an alkaline reacting compound of an alkali metal, passing the combustion gases upwardly through the belt while in the lehr and repassing the belt through the solution to wash off accumulated sulphate salt.

ROWLAND D. SMITH.